US006556943B2

United States Patent
Kuwahara et al.

(10) Patent No.: US 6,556,943 B2
(45) Date of Patent: Apr. 29, 2003

(54) POSITION CALCULATION METHOD AND POSITION CALCULATION APPARATUS

(75) Inventors: Mikio Kuwahara, Hachioji (JP); Tomoaki Ishifuji, Tokyo (JP); Takashi Yano, Tokorozawa (JP); Kenzaburo Fujishima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 73 days.

(21) Appl. No.: 09/918,641

(22) Filed: Aug. 1, 2001

(65) Prior Publication Data

US 2002/0147566 A1 Oct. 10, 2002

(30) Foreign Application Priority Data

Feb. 7, 2001 (JP) ........................................ 2001-030859

(51) Int. Cl.$^7$ .............................. H04Q 7/20; G01C 3/32
(52) U.S. Cl. ...................... 702/150; 342/457; 455/456; 701/213; 701/214; 702/115
(58) Field of Search ................................. 342/359, 450, 342/458, 463, 464, 465; 455/67.1, 226.1, 456, 457, 524, 525; 701/200, 213–214, 300; 702/85–87, 92, 94, 95, 150, 151

(56) References Cited

U.S. PATENT DOCUMENTS

| 4,411,007 | A | 10/1983 | Rodman et al. ............. 375/356 |
| 4,817,113 | A | 3/1989 | Lundquist et al. .......... 375/141 |
| 5,119,102 | A | 6/1992 | Barnard ................. 342/357.09 |
| 5,974,329 | A | 10/1999 | Wylie et al. ................ 455/456 |
| 5,982,757 | A | 11/1999 | Curtis et al. ................ 370/328 |
| 6,061,565 | A | 5/2000 | Innes et al. .................. 455/436 |
| 6,064,888 | A | 5/2000 | Lundqvist et al. .......... 455/456 |
| 6,070,079 | A | 5/2000 | Kuwahara ................... 455/456 |
| 6,108,553 | A | 8/2000 | Silventoinen et al. ....... 455/456 |
| 6,108,558 | A | 8/2000 | Vanderspool, II ........... 455/456 |
| 6,133,875 | A | 10/2000 | Kishimoto ................... 342/456 |
| 6,157,842 | A | 12/2000 | Karlsson et al. ............. 455/456 |
| 6,169,903 | B1 | 1/2001 | Dorenbosch et al. ........ 455/458 |
| 6,181,944 | B1 | 1/2001 | Uebayashi et al. .......... 455/456 |
| 6,198,935 | B1 | 3/2001 | Saha et al. .................. 455/456 |
| 6,243,648 | B1 | 6/2001 | Kilfeather et al. ........... 701/213 |
| 6,246,884 | B1 | 6/2001 | Karmi et al. ................ 455/521 |
| 6,252,543 | B1 | 6/2001 | Camp ..................... 342/357.06 |
| 6,289,211 | B1 | 9/2001 | Koorapaty et al. .......... 455/404 |
| 6,295,454 | B1 | 9/2001 | Havinis et al. .............. 455/456 |
| 6,300,905 | B1 | 10/2001 | Chen et al. .................. 342/458 |
| 6,329,948 | B1 | 12/2001 | Ishikawa .................... 342/457 |
| 6,330,454 | B1 | 12/2001 | Verdonk ..................... 455/456 |

FOREIGN PATENT DOCUMENTS

| JP | 7-181242 | 12/1993 |
| JP | 2000-075012 | 9/1998 |
| WO | WO 00/75684 | 6/1999 |

OTHER PUBLICATIONS

U.S. patent application Publication, Pub No. 2001/0004601 A1, Drane et al, publication date Jun. 21, 2001, filing date Feb. 2, 2001.

Primary Examiner—John Barlow
Assistant Examiner—John Le

(57) ABSTRACT

A position calculation method that calculates the correct position of a terminal even when errors are not distributed symmetrically for positive and negative values, by calculating the position of a terminal using the delay time of received signals. The method calculates a first range that is a difference between a range from the terminal to each of antenna and a range from the terminal to a base antenna, the range being calculated from a wireless signal delay time; calculates a second range that is a difference between a range from an assumed terminal position for calculation to each antenna and a range from the assumed terminal position for calculation to the base antenna; calculates a likelihood of the position of the terminal, repeats these procedures to obtain a point where the likelihood is maximized, and determines an obtained most likely solution as the position of the terminal.

10 Claims, 6 Drawing Sheets

POSITION CALCULATION METHOD AND POSITION CALCULATION APPARATUS

BACKGROUND OF THE INVENTION

The present invention relates to a method for measuring the range between a transmitter or a receiver and a terminal in a wireless communication to calculate the position of the terminal from the range measurement result. More particularly, the present invention relates to a method for calculating the position of a terminal using a delay time from a wireless base station to a terminal (or from a terminal to a wireless base station).

In a mobile communication system, some technologies for calculating the position of a terminal with the use of the signals from a base station have been proposed. For example, in JP-A-7-181242 laid-open on Jul. 21, 1995, a technology for measuring the position of a terminal is proposed for use in a Code Division Multiple Access (CDMA) system. The proposed technology is that base station positions and the propagation time of a signal transmitted from each of the base stations to a terminal are used to calculate the differences in the PN code transmission times from the base stations. These time differences are then used to calculate the position of the terminal.

In calculating the position of a terminal from the multiple range measurement results, the position of the terminal is usually calculated using the least square method on the assumption that position calculation errors are distributed according to the Gaussian distribution. In addition, to calculate the terminal position more precisely, another position calculation method is sometimes used in which the range is measured multiple times for calculating the terminal position, the multiple calculated positions are averaged, and the center of gravity of the multiple positions are used as the result of measurements.

SUMMARY OF THE INVENTION

In the conventional position calculation methods described above, the least square method is used to calculate the position of a terminal assuming that position data collected by range measurements is distributed according to the Gaussian distribution. This method is based on the assumption that positive and negative range measurement errors occur evenly, that is, lags and leads occur with an equal probability in the signal from the terminal to the base station.

Range measurement errors are generated primarily by two causes: noises and multi-path reflections caused by signal reflections. In general, noises have an effect when the S/N ratio of received signals is low. When noises are major causes of errors with little or no multi-path reflection, the least square method gives the most likely solution.

On the other hand, multi-path reflections have an effect regardless of the S/N ratio, and this effect is serious even when the signal strength is high (good S/N ratio). The delay profiles of received signals affected by multi-path reflections result, not always in the Gaussian distribution, but sometimes in an asymmetric distribution for positive and negative values. Therefore, when the measurement is made under good S/N ratio conditions but with some multi-path reflections, the position calculation made by the least square method does not give the most likely solution.

Another well-known method for increasing the precision is that the measurement is made multiple times and the position is calculated using the measurement results to give the center of gravity of calculated multiple points (arithmetic mean of multiple coordinates) as the measurement result of the points. However, depending upon how measurement positions are distributed, this arithmetic mean does not always give a correct position.

It is an object of the present invention to provide a position calculation method that gives a correct position even when measurement errors are not distributed symmetrically for positive and negative values.

According to one aspect of the present invention, there is provided a position calculation method wherein a terminal receives signals from a plurality of antennas located at known and different positions and from a base antenna, or the plurality of antennas located at known and different positions and the base antenna receive signals from the terminal, for calculating a position of the terminal using wireless signal delay times, the method comprising:

a first procedure for calculating, for each of the plurality of antennas, a first range that is a difference between a range from the terminal to each of the plurality of antennas, the range being calculated based on a wireless signal delay time, and a range from the terminal to the base antenna, the range being calculated based on a wireless signal delay time;

a second procedure for calculating, for each of the plurality of antennas, a second range that is a difference between a range from an assumed terminal position for calculation purposes to each of the plurality of antennas and a range from the assumed terminal position for calculation purposes to the base antenna;

a third procedure for calculating, for each of the plurality of antennas, an error that is a difference between the first range and the second range;

a fourth procedure for calculating, assuming that the errors have a distribution asymmetric for positive and negative values, a likelihood of the assumed terminal position using the distribution and the errors each calculated for each of the plurality of antennas; and a fifth procedure for repeating the second to fourth procedures to obtain a point where the likelihood is maximized and for determining an obtained most likely solution as the position of the terminal.

According to another aspect of the present invention, there is provided a position calculation apparatus comprising a receiver that receives signals from a plurality of antennas located at known and different positions and from a base antenna, a delay profile analysis apparatus that performs delay profile analysis for the signals received by the receiver, and a calculation apparatus that uses wireless signal delay times included in delay profile analysis results, produced by the delay profile analysis apparatus, to calculate a position of the position calculation apparatus, wherein the calculation apparatus comprises:

first range calculation means for calculating, for each of the plurality of antennas, a first range that is a difference between a range from the terminal to each of the plurality of antennas, the range being calculated based on a wireless signal delay time, and a range from the terminal to the base antenna, the range being calculated based on a wireless signal delay time;

second range calculation means for calculating for each of the plurality of antennas, a second range that is a difference between a range from an assumed terminal position for calculation purposes to each of the plurality of antennas and a range from the assumed terminal position for calculation purposes to the base antenna;

error calculation means for calculating, for each of the plurality of antennas, an error that is a difference between the first range and the second range;

likelihood calculation means for calculating, assuming that the errors calculated by the error calculation means have a distribution asymmetric for positive and negative values, a likelihood of the assumed terminal position using the distribution and the errors each calculated for each of the plurality of antennas; and terminal position search means for obtaining a point where the likelihood of the assumed terminal position is maximized and for determining an obtained most likely solution as the position of the terminal.

A method in an embodiment according to the present invention uses multiple measurement results to calculate the most likely solution with the probability distribution function taken into consideration. Therefore, when calculating the position of a terminal using range measurement results based on wireless signal delay times, the method calculates the position of the terminal precisely even when the signal strength is high and errors are generated primarily by multi-path reflections. That is, the method calculates the likelihood not with a Gaussian distribution but with a function that produces a distribution of actual range measurement errors, thus ensuring a most likely solution that is correct.

DESCRIPTION OF THE EMBODIMENTS

Some embodiments of the present invention will be described in detail with reference to the attached drawings.

Figure 1:
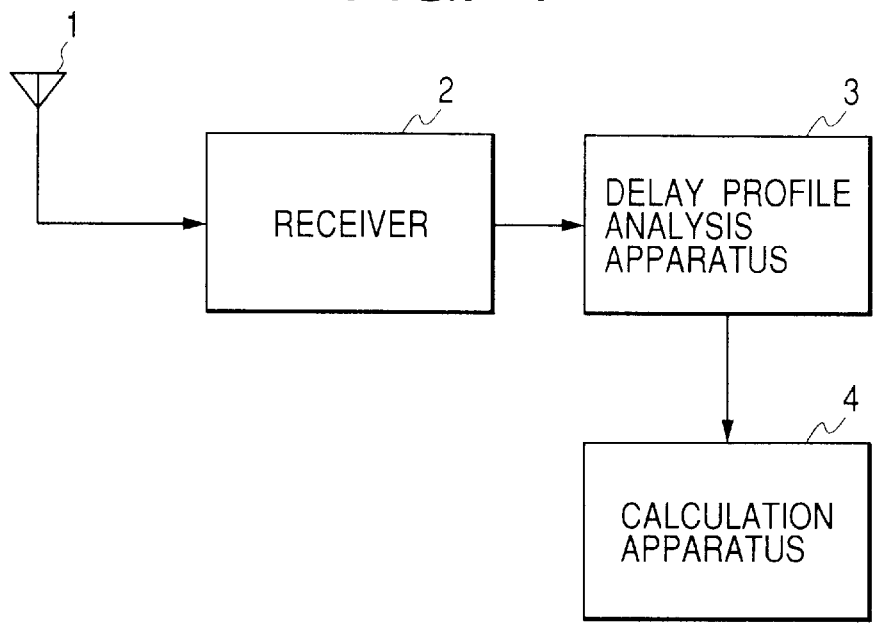
FIG. 1 is a block diagram showing a terminal in a first embodiment o f the present invention.

FIG. 1 is a block diagram showing the general configuration of a terminal in a first embodiment of the present invention.

The terminal comprises a receiver 2 that receives signals collected by an antenna 1, a delay profile analysis apparatus 3, and a calculation apparatus 4.

The receiver 2 converts the frequency of a received signal to produce a baseband signal. The delay profile analysis apparatus 3 performs sliding correlator with a known signal sent from a base station using a matched filter to detect the timing of a received signal and to calculate the reception timing of the received signal. The transmission timing of a signal from a base station, which is known information defined for each base station, may be obtained from a center unit (not shown) connected via a base station unit or from a database in the terminal in which the correspondence between the transmission timing of a base station and a base station ID is stored.

In addition, the delay profile analysis apparatus 3 calculates the difference between the calculated reception timing and the transmission timing of the base station to calculate the delay time required for propagation and then multiplies the delay time by the radio wave propagation speed (light velocity) to estimate the propagation range. In this way, the delay profile analysis apparatus 3 calculates a pseudo measured range.

A "pseudo range" calculated by the delay profile analysis apparatus 3 is the difference between the range from an assumed terminal position to the antenna installed on a base station and the range from the terminal position to the antenna installed on the reference base station (see formula 7). The "assumed terminal position" is the position of a terminal assumed for calculation (see formula 4). The calculation method, which will be described later, searches for the most likely position of a terminal while changing the terminal from one position to another. A "pseudo measured range" is the difference between the range from a terminal calculated based on the delay time to the antenna installed on a base station and the range from the terminal calculated based on the delay time to the antenna installed on the reference base station (see formula 3). A "range measurement error" is calculated by subtracting the pseudo range from the pseudo measured range (see formula 11).

In the description above, a "pseudo" value indicates the difference between the range from a terminal to a base station and the range from the terminal to the reference base station. A "measured" value indicates a range measured by the delay time of the radio wave, while a value not including the word "measured" indicates a range in a straight line on the map between an assumed terminal position and a base station position.

The calculation apparatus 4 is a DSP (Digital Signal Processor) or a CPU. The calculation apparatus 4, which contains a program for the position calculation method that will be described later, uses the pseudo measured ranges of a plurality of base stations analyzed by the delay profile analysis apparatus 3 to calculate the position of a terminal.

The calculation apparatus 4 may be included in the receiver 2. For example, a B/B-LSI that performs baseband processing may read a program from a memory for execution. Alternatively, a controller (CPU) controlling the operation of the receiver may read a program from the memory for execution.

Next, with reference to FIGS. 2 and 3, the distribution of position measurement errors will be described.

Figure 2:
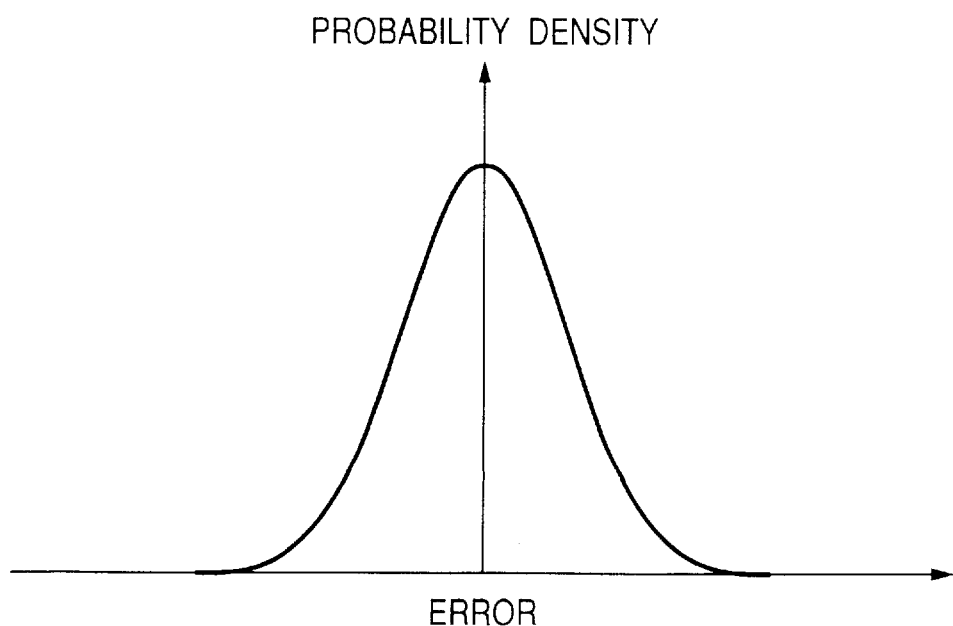
FIG. 2 is a distribution diagram showing the Gaussian distribution.
Figure 3:
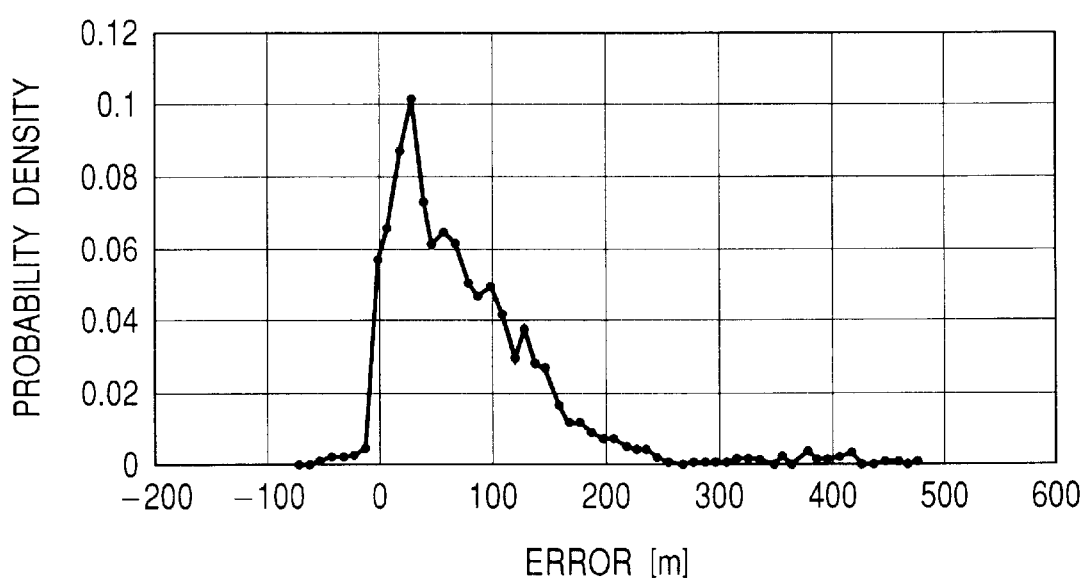
FIG. 3 is a distribution diagram showing actual position measurement errors.

FIG. 2 is a distribution diagram showing a Gaussian distribution. Conventionally, it has been assumed that position measurement errors are distributed according to this distribution. FIG. 3 is a distribution diagram showing the actual measurement error values. In both figures, the horizontal axis indicates an error in range measurement, and the vertical axis indicates a probability density.

As described above, if noises are the major causes of detected errors on a propagation path (delay time), the range measurement errors (errors detected in delay times) are distributed according to the Gaussian distribution shown in FIG. 2 because noises are distributed according to the Gaussian distribution. Therefore, in this case, the least square method gives the most likely solution.

However, when the S/N ratio of received signals is good, the major causes of errors detected in delay times are not noises but multi-path reflection interferences (self interference). Because reflected waves traveling through multi-paths always reach after the direct wave, the actual measured errors are not distributed symmetrically for negative errors (lead) and positive errors (lag) as shown in FIG. 3. Therefore, estimating the propagation range with use of the least square method on the assumption that errors are distributed according to the Gaussian distribution would not give the most likely solution. To obtain the most likely solution, it is necessary to measure the propagation range and to calculate the position with the use of a distribution function, asymmetric for positive and negative values, that corresponds to actual measured values (FIG. 3).

The principle of the position calculation method according to the present invention, which is used for a distribution asymmetric for positive and negative range measurement errors, will be described. In the description below, let M be the number of base stations to be observed, let the measured result of the range between the mth base station and the terminal be:

$$r_m \quad \text{[Formula 1]}$$

and let the measured result of the range between the base station with the highest signal strength (SYNC base station) and the terminal be:

$$r_{SYNC} \quad \text{[Formula 2]}$$

Because it is difficult for the terminal to fully synchronize with a base station and because the clock used for measuring delay times is not so accurate, it is difficult to know the accurate transmission timing of the base station. Therefore, instead of measuring the absolute range between the base station and the terminal, the relative range is measured with a particular base station as the reference station. In the most likely solution calculation method shown in FIG. 4, the pseudo measured range is represented by the difference between the measured result of the range from a base station to the terminal and the measured result of the range from a base station with the highest signal strength (SYNC base station) to the terminal.

$$r_{diff,m} = r_m - r_{SYNC} \quad \text{[Formula 3]}$$

Let the estimated position of the terminal be:

$$(x_{cand}, y_{cand}) \quad \text{[Formula 4]}$$

Let the position of the mth base station be:

$$(x_m, y_m) \quad \text{[Formula 5]}$$

Let the position of the SYNC base station be:

$$(x_{SYNC}, y_{SYNC}) \quad \text{[Formula 6]}$$

The pseudo range using the estimated terminal position is represented also by the difference between the range from the terminal to the base station and the range from the terminal to the SYNC base station as given below.

$$d_{diff,m} = d_m - d_{SYNC} \quad \text{[Formula 7]}$$

Here, the range from the mth base station position to the estimated terminal position is represented as:

$$d_m = \sqrt{(x_m - x_{cand})^2 + (y_m - y_{cand})^2} \quad \text{[Formula 8]}$$

The range from the SYNC base station position to the estimated terminal position is represented as:

$$d_{SYNC} = \sqrt{(x_{SYNC} - x_{cand})^2 + (y_{SYNC} - y_{cand})^2} \quad \text{[Formula 9]}$$

Let the probability density function of range measurement error $\Delta$ be:

$$p(\Delta) \quad \text{[Formula 10]}$$

When the S/N ratio detected during a pseudo measured range measurement is high, the delay time of the signal received from the base station is always longer than the delay time (true delay time) of the direct wave and, therefore, a lag always occurs. In addition, the longer the dearly time is, the smaller the probability of a lag. This means that the probability distribution of positive errors (lag errors) is a monotone decreasing function. This agrees with the distribution of error values (FIG. 3). Therefore, the error of the measured result with the minimum error is thought to be near 0, and the minimum of the range measurement error may be assumed to be 0. Therefore, the calculation method according to the present invention searches for a base station with the minimum range-measurement error and uses this base station as the reference base station. The error of the terminal is represented by the difference between the pseudo measured range ($r_{DIFF,M}$, range calculated by receiving the signal from base station m) and the pseudo range ($d_{DIFF,M}$, range from the assumed terminal position to base station m). This error is represented as follows:

$$\Delta_m = r_{diff,m} - d_{diff,m} \quad \text{[Formula 11]}$$

The method searches for a base station with the minimum $\Delta m$. Let the minimum be:

$$\Delta_{min} \quad \text{[Formula 12]}$$

At this time, the likelihood is represented by:

$$\xi = \prod_m p(\Delta_m - \Delta_{min}) \quad \text{[Formula 13]}$$

The solution with the maximum likelihood is the most likely solution.

The most likely solution calculation method described above is compatible with any probability distribution. However, the distribution of errors detected in actual range measurement is similar to the distribution of an exponential function (see FIG. 3). In the most likely solution calculation method described below, it is assumed that range measurement errors are distributed according to an exponential distribution.

If an exponential function is used as the probability distribution function, the likelihood is calculated as follows:

$$\xi = \prod_m \exp\{-(\Delta_m - \Delta_{min})^\beta\} \quad \text{[Formula 14]}$$

To simplify the calculation, use logarithm for both sides.

$$\Xi = \log \xi = -\sum_m (\Delta_m - \Delta_{min})^\beta \quad \text{[Formula 15]}$$

Because logarithm is a monotone increasing function, the maximum logarithm value is the solution. If $\beta=1$ is assumed in formula 15, then there is no need for complex operation, such as an exponential function, and the calculation may be made only by addition and subtraction, meaning that the amount of operation may be reduced significantly.

In addition, the method searches for a solution with the maximum likelihood by varying the estimated position ($x_{CAND}$, $y_{CAND}$) of the terminal.

Based on the principle of calculation described above, an operation of a terminal in a first embodiment of the present invention that finds the most likely solution will be described.

Figure 4:
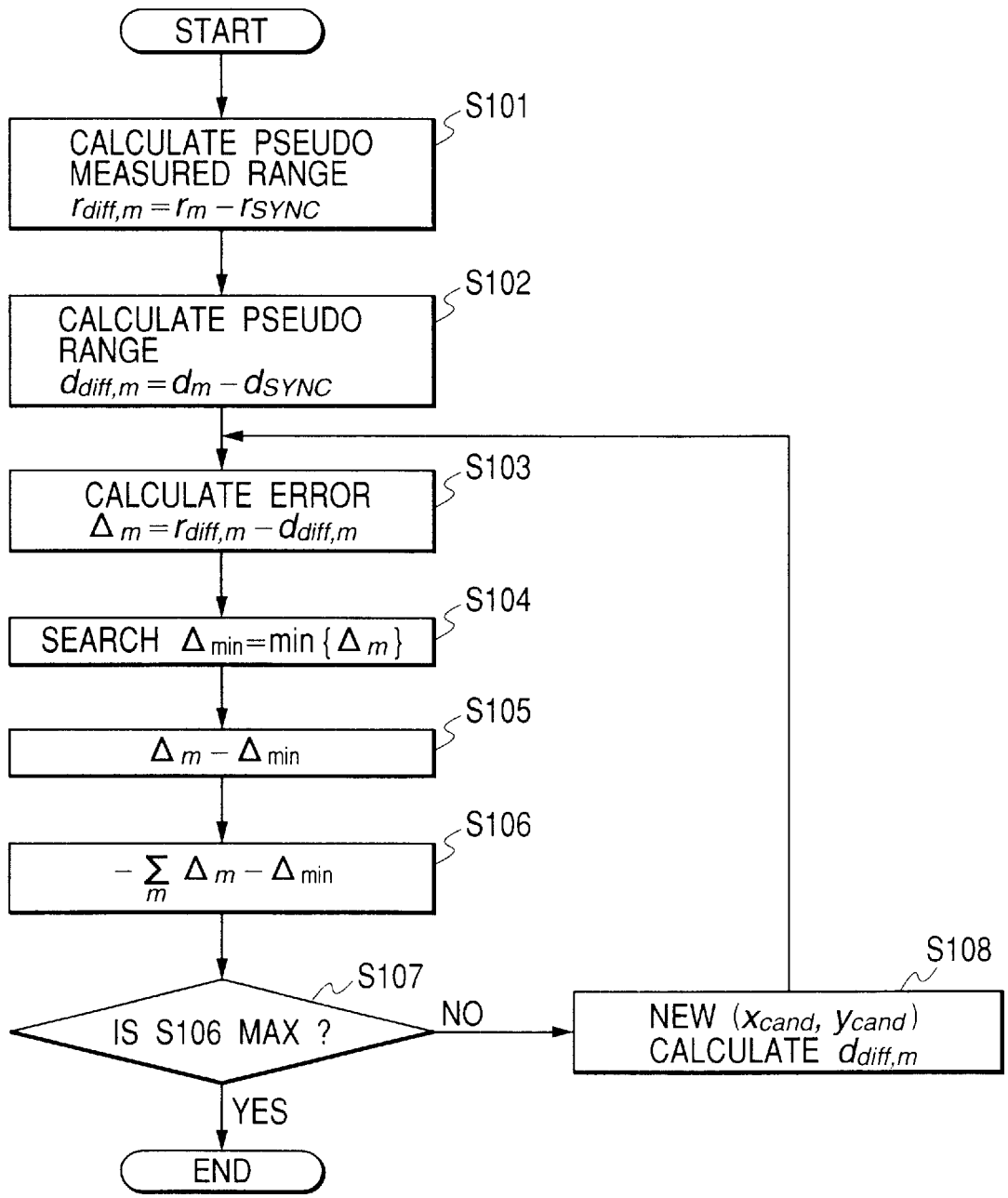
FIG. 4 is a flowchart showing how the terminal in the first embodiment finds the most likely solution.

FIG. 4 is a flowchart showing the position calculation method by which the terminal in the first embodiment of the present invention finds a most likely solution.

The receiver 2 receives a signal from a base station. From the delay time calculation result obtained by the delay profile analysis apparatus 3 by calculating the delay profile, the difference between the range from base station m to the terminal and the range from a reference base station (SYNC base station) to the terminal is calculated using formula 3 to find the pseudo measured range $r_{DIFF,M}$ (S101). Then, the terminal position is assumed, and the difference between the range from base station m to the assumed terminal position and the range from the reference base station (SYNC base station) to the assumed terminal position is calculated using formula 7 to find the pseudo range $d_{DIFF,M}$ (S102). In addition, the difference between the pseudo measured range $r_{DIFF,M}$ calculated in S101 and the pseudo range $d_{DIFF,M}$ calculated in S102 is calculated using formula 11 to find the range measurement error $\Delta m$ of the terminal (S103). Then, $\Delta MIN$, which is the minimum of the range measurement errors $\Delta m$ of the terminal obtained in step S103, is determined (S104).

Then, the difference between the range measurement error $\Delta m$ of the terminal calculated in step S103 and the minimum $\Delta MIN$ of the range measurement error of the terminal calculated in step S104 is calculated (S105), the differences are added up for the base stations, and the sign of the calculated result is inverted (S106). This operation corresponds to the operation of formula 15, and the obtained value is the likelihood of the terminal at the estimated position.

Then, the most likely solution that has the maximum likelihood calculated in S106 is obtained using the steepest descent method (S107). That is, if the likelihood obtained in S106 is not the maximum (No in S107), the estimated position ($x_{CAND}$, $y_{CAND}$) of the terminal is updated in S108, and the pseudo range $d_{DIFF,M}$ is calculated. Finding the estimated point of the terminal position where the likelihood is the maximum in this way gives the solution of the terminal position. This solution is the most likely solution that is applicable when errors are distributed according to the exponential distribution.

It should be noted that the calculation of formula 15 with $\beta=1$ may generate a major error. This is because, in some cases, the number of range measurement errors decreases, and reaches 0, more rapidly than in the exponential distribution. To apply the present invention to such a case, the parameter of the exponential function should be raised to the $\beta$-th power as shown in formula 14. This allows the distribution function to be converged more rapidly, and the most likely value to be derived with more rigorous conditions attached to lags.

Although the probability density function is assumed to be the exponential function in this embodiment, a function other than the exponential function may also be used. Even if the probability density function does not change exponentially, formula 13 may be applied to any probability distribution to calculate the likelihood.

As described above, this embodiment is characterized in that an error difference is obtained with the smallest measurement error as the reference and, using this difference, the likelihood is calculated. Even if the probability distribution of a function is asymmetric for positive and negative values, the position of the terminal may be identified precisely.

In addition, as shown in the actual measured error values (FIG. 3), the probability of negative range measurement errors is low. This makes it possible to ignore negative range measurement errors and to calculate the most likely value with only the positive range measurement errors assumed as a monotone decreasing function. For example, the probability distribution of positive range measurement errors is calculated as the following linear function.

$$p(\Delta)=-a\Delta+b \quad \text{[Formula 16]}$$

Next, another operation of the terminal in the first embodiment of the present invention, in which the most likely solution is calculated, will be described. Unlike the above-described position calculation method (FIG. 4) for obtaining the most likely solution, the calculation method described below measures a signal from a base station multiple times and performs position calculation using multiple delay time (propagation range) measurement results. Although the exponential function is used as an example of the probability distribution function in the description below, the present invention is not limited to the exponential function as described above.

First, the principle of calculation will be described. In the description below, the subscript n is used to represent a particular measurement result of multiple measurement results. Out of observed M base stations, let the measured result of the range between the mth base station and the terminal be:

$$r_{m,n} \quad \text{[Formula 17]}$$

and let the measured result of the range between the base station with the highest signal strength (SYNC base station) and the terminal be:

$$r_{SYNC,n} \quad \text{[Formula 18]}$$

The pseudo measured range, which is the difference between the measured result of the range from the mth base station to the terminal and the measured result of the range from the terminal to the SYNC base station is represented as:

$$r_{diff,m,n}=r_{m,n}-r_{SYNC,n} \quad \text{[Formula 19]}$$

Let the estimated position of the terminal be:

$$(x_{cand}, y_{cand}) \quad \text{[Formula 20]}$$

Let the position of the mth base station be:

$$(x_m, y_m) \quad \text{[Formula 21]}$$

Let the position of the SYNC base station be:

$$(x_{SYNC}, y_{SYNC}) \quad \text{[Formula 22]}$$

The pseudo range using the estimated terminal position is represented similarly by the difference between the range from the terminal to the base station and the range from the terminal to the SYNC base station as given below.

$$d_{diff,m}=d_m-d_{SYNC} \quad \text{[Formula 23]}$$

Here, the range from the mth base station position to the estimated terminal position is represented as:

$$d_m=\sqrt{(x_m-x_{cand})^2+(y_m-y_{cand})^2} \quad \text{[Formula 24]}$$

The range from the SYNC base station position to the estimated terminal position is represented as:

$$d_{SYNC}=\sqrt{(x_{SYNC}-x_{cand})^2+(y_{SYNC}-y_{cand})^2}$$ [Formula 25]

Here, the calculation method according to the present invention searches for a base station with the minimum range-measurement error. The error of the terminal is represented as follows:

$$\Delta_{m,n}=r_{diff,m,n}-d_{diff,m}$$ [Formula 26]

The method searches for a base station with the minimum ΔMIN,N. Let the minimum be:

$$\Delta_{min,n}$$ [Formula 27]

If an exponential function is used as the probability distribution function, the likelihood is calculated as follows:

$$\xi = \prod_n \prod_m \exp\{-(\Delta_{m,n} - \Delta_{min,n})^\beta\}$$ [Formula 28]

To simplify the calculation, use logarithm for both sides.

$$\Xi = \log\xi = -\sum_n \sum_m (\Delta_{m,n} - \Delta_{min,n})^\beta$$ [Formula 29]

Because logarithm is a monotone increasing function, the maximum logarithm value is the solution. In actual measurements that are made multiple times, some base stations are observed more frequently than other base stations. This method reflects this fact formula 29 using weighting. That is, a value to be added is multiplied by the weight of WM,N.

$$\Xi = \log\xi = -\sum_n \sum_m w_{m,n}(\Delta_{m,n} - \Delta_{min,n})^\beta$$ [Formula 30]

When a base station is not observed, the weight is 0 as follows:

$$w_{m,n}=0$$ [Formula 31]

The weight of a base station that is observed in multiple measurements is:

$$w_{m,n}=1/M(m)$$ [Formula 32]

where, M(m) indicates the number of times the mth base station was observed during the multiple times of measurements. This weighting processing reduces the weights of frequently observed stations to limit their effects.

Figure 5:
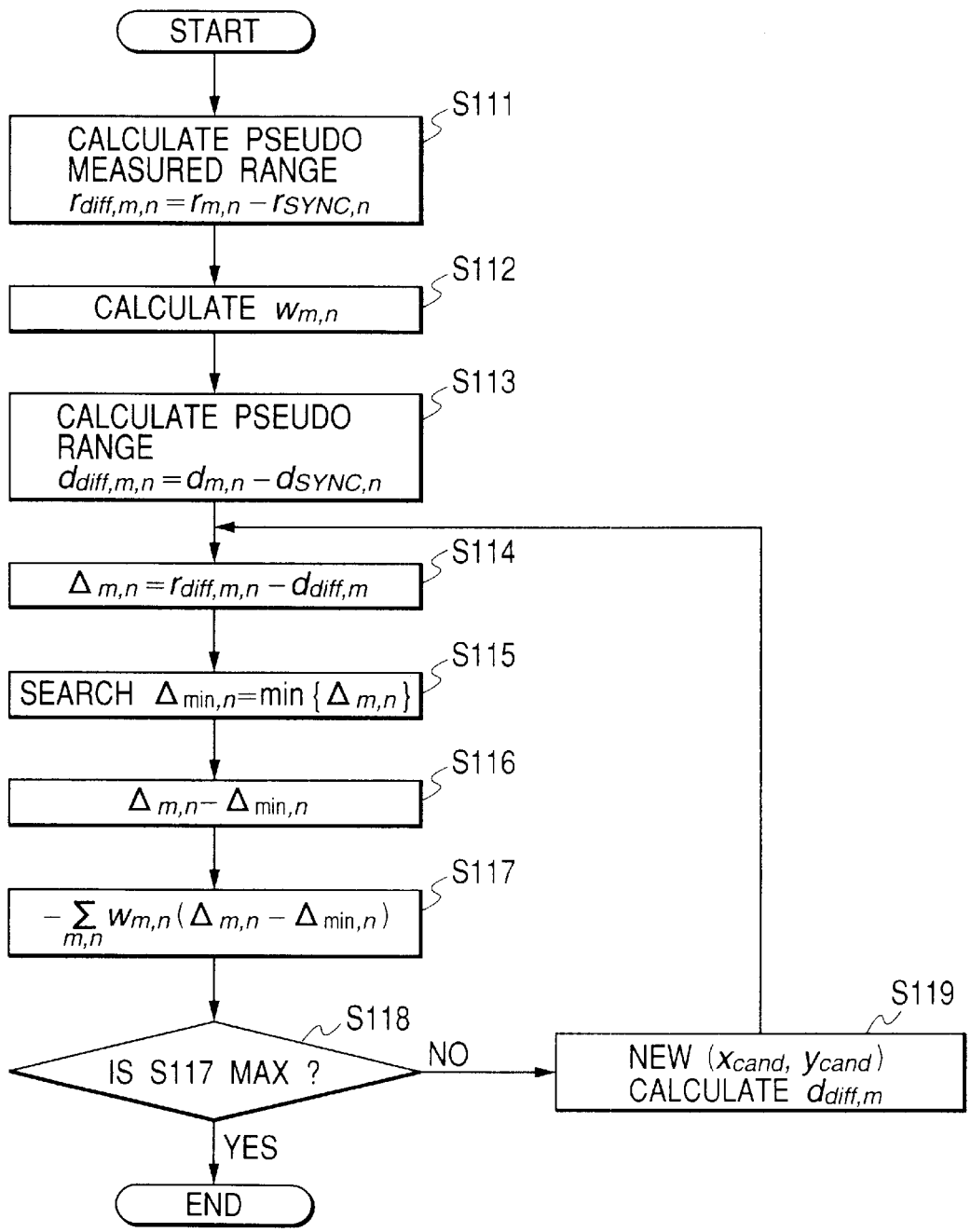
FIG. 5 is another flowchart showing how the terminal in the first embodiment finds the most likely solution.

FIG. 5 is a flowchart showing another position calculation method by which the terminal in the first embodiment of the present invention finds a most likely solution.

The receiver 2 receives a signal from a base station. From the delay time calculation result calculated by the delay profile analysis apparatus 3 from the delay profile, the difference between the range from base station m to the terminal and the range from a reference base station (SYNC base station) to the terminal is calculated using formula 19 to find the pseudo measured range $r_{DIFF,M,N}$ (S111). Next, a check is made as to how many times the range from the terminal to each base station has been measured, and the weight is determined according to formulas 31 and 32 (S112). Then, the terminal position is assumed, and the difference between the range from base station m to the assumed terminal position and the range from the reference base station (SYNC base station) to the assumed terminal position is calculated using formula 23 to find the pseudo range $d_{DIFF,M}$ (S113). In addition, the difference between the pseudo measured range $r_{DIFF,M,N}$ calculated in S111 and the pseudo range $d_{DIFF,M}$ calculated in S113 is calculated using formula 26 to find the range measurement error ΔM,N of the terminal (S114). Then, ΔMIN,N, which is the minimum of the range measurement errors ΔM,N obtained in S114, is obtained (S115).

Then, the difference between the range measurement error ΔMN of the terminal calculated in step S114 and the minimum ΔMIN,N of the range measurement error of the terminal calculated in step S115 is calculated (S116), the differences are added up for the base stations m and for the number of measurements n, and the sign of the calculated result is inverted (S117). This operation corresponds to the operation of formula 30, and the obtained value is the likelihood of the terminal at the estimated position.

Then, the most likely solution that has the maximum likelihood calculated in S117 is obtained using the steepest descent method (S118). That is, if the likelihood obtained in S117 is not the maximum (No in S118), the estimated position ($x_{CAND}$, $y_y$AND) of the terminal is updated in S119, and the pseudo range $d_{DIFF,M}$ is calculated. Finding the estimated point of the terminal position where the likelihood is the maximum in this way gives the solution of the terminal position. This solution is the most likely solution that is applicable when the errors of multiple range measurement results are distributed according to the exponential distribution.

In the position measurement method described above, a terminal receives signals from multiple base stations and measures the range between the terminal and a base station to calculate the position of the terminal. Alternatively, multiple base stations may receive a signal sent the terminal, and each base station may measure the range between the terminal and the base station to calculate the position of the terminal.

As described above, the terminal in the first embodiment comprises a receiver 2 that receives signals from a plurality of base stations located at known and different positions and from a reference base station, a delay profile analysis apparatus 3 that performs delay profile analysis for the signals received by the receiver 2, and a calculation apparatus 4 that uses wireless signal delay times included in delay profile analysis results produced by the delay profile analysis apparatus 3 to calculate a position of the position calculation apparatus. The calculation apparatus 4 comprises pseudo measured range calculation means for calculating, for each of the plurality of base stations, a pseudo measured range $r_{DIFF,M}$ that is a difference between a range from the terminal to each of the plurality of base stations, the range being calculated based on a wireless signal delay time, and a range from the terminal to the reference base station, the range being calculated based on a wireless signal delay time; pseudo range calculation means for calculating, for each of the plurality of base stations, a pseudo range $d_{DIFF,M}$ that is a difference between a range from an assumed terminal position for calculation purposes to each of the plurality of base stations and a range from the assumed terminal position for calculation purposes to the reference base station; error calculation means for calculating, for each of the plurality of base stations, an error Δm that is a difference between the pseudo measured range $r_{DIFF,M}$ calculated by the pseudo measured range calculation means and the pseudo range $d_{DIFF,M}$ calculated by the pseudo range calculation means;

likelihood calculation means for calculating, assuming that the errors $\Delta m$ calculated by the error calculation means have a distribution asymmetric for positive and negative values, a likelihood of the assumed terminal position using the distribution and the errors each calculated for each of the plurality of base stations; and terminal position search means for obtaining a point where the likelihood of the assumed terminal position is maximized and for determining the maximum likelihood point as the position of the terminal.

Therefore, the method used by a terminal in the first embodiment comprises a first procedure for calculating, for each of a plurality of base stations, a pseudo measured range $r_{DIFF,M}$ that is a difference between a range from the terminal to each of the plurality of base stations, the range being calculated based on a wireless signal delay time, and a range from the terminal to a reference base station, the range being calculated based on a wireless signal delay time;

a second procedure for calculating, for each of the plurality of base stations, a pseudo range $d_{DIFF,M}$ that is a difference between a range from an assumed terminal position for calculation purposes to each of the plurality of base stations and a range from the assumed terminal position for calculation purposes to the reference base station;

a third procedure for calculating, for each of the plurality of base stations, an error $\Delta m$ that is a difference between the pseudo measured range $r_{DIFF,M}$ calculated by the first procedure and the pseudo range $d_{DIFF,M}$ calculated by the second procedure; a fourth procedure for calculating, assuming that the errors $\Delta m$ have a distribution asymmetric for positive and negative values, a likelihood of the terminal position, assumed by the second procedure, using the distribution and the errors each calculated for each of the plurality of base stations; and a fifth procedure that repeats the second to fourth procedures to obtain a point where the likelihood is maximized, determines an obtained most likely solution as the position of the terminal and, therefore, calculates the likelihood by a function producing a distribution similar to the actual range measurement distribution even if the plurality of measurement results are not distributed according to the Gaussian distribution. Therefore, the terminal position may be calculated precisely.

In addition, the method calculates the likelihood of the position of the terminal assuming that the error distribution is an exponential function which is a non-negative monotone decreasing function in the range where the errors are positive, eliminating the need for complex operation and reducing the amount of operation.

In addition, the fourth procedure comprises a sixth procedure for determining a minimum error; a seventh procedure for calculating a difference between each error $\Delta m$ calculated by the third procedure and the minimum error $\Delta MIN$ determined by the sixth procedure to find a corrected error; and an eighth procedure for adding the errors obtained by the seventh procedure for calculating the likelihood based on an addition result.

In addition, the eighth procedure comprises a ninth procedure for raising the corrected errors to the β-th power before the addition. This allows the position of the terminal to be calculated with the error distribution function converging more rapidly and with more rigorous conditions attached to lags.

In a position calculation method shown in FIG. 5, the pseudo measured range $r_{DIFF,M,N}$ is measured multiple times. The fourth procedure uses the calculation result of multiple pseudo measured ranges $r_{DIFF,M,N}$ to calculate the likelihood of the terminal position assumed by the second procedure. The likelihood is calculated by placing a weight (WM, N) according to the number of times the pseudo measured range $r_{DIFF,M,N}$ is measured. This weighting prevents the effect of a frequently detected base station from becoming too large, making it possible to find the terminal position more precisely.

Figure 6:
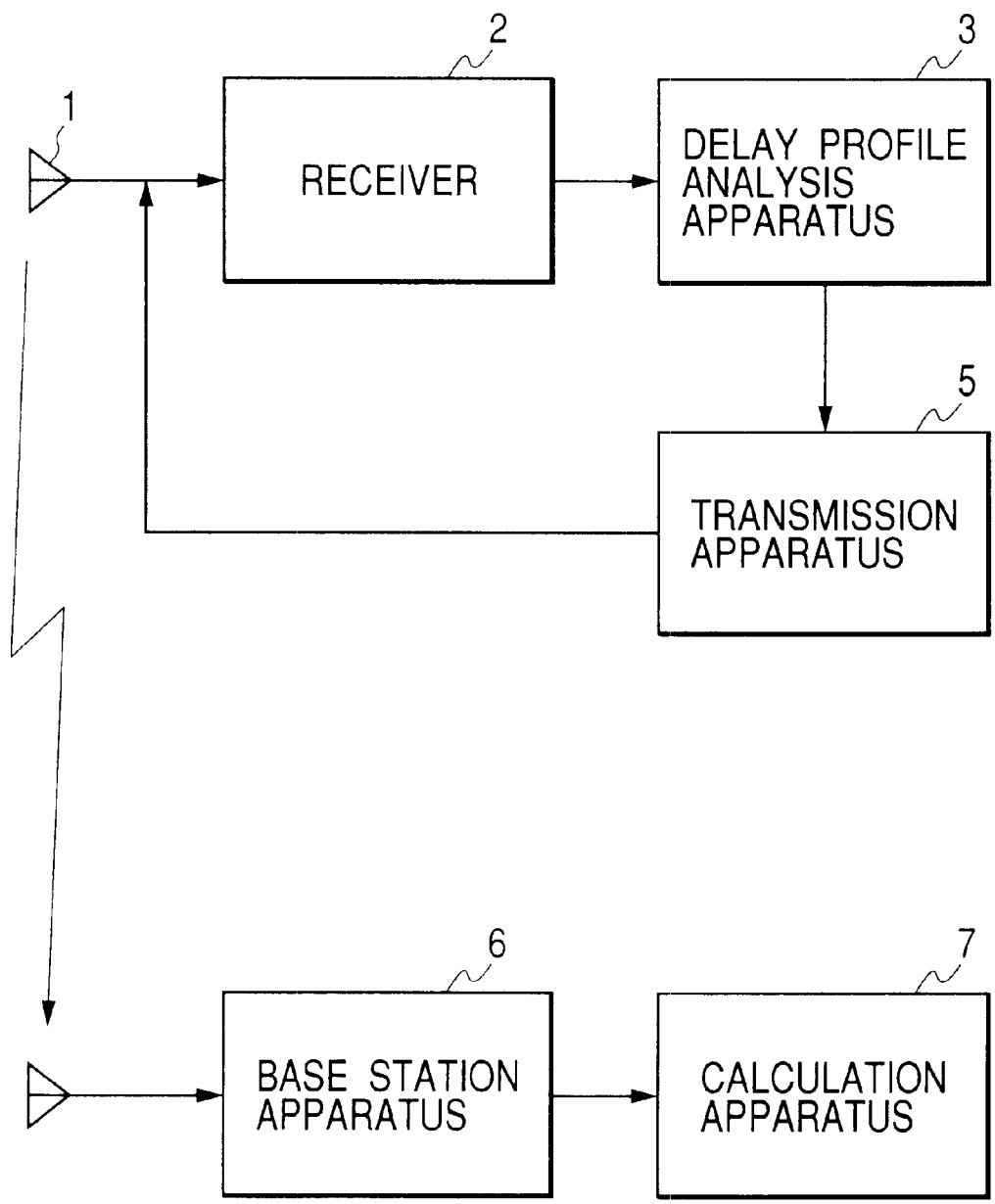
FIG. 6 is a block diagram showing a position detection system in a second embodiment of the present invention.

FIG. 6 is a block diagram showing the general configuration of a position calculation system in a second embodiment of the present invention.

The terminal in the first embodiment (FIG. 1) comprises the receiver 2, delay profile analysis apparatus 3, and calculation apparatus 4, and the terminal calculates the position of the terminal. However, because a center apparatus (calculation apparatus 7) may calculate the position of the terminal, the center apparatus has the calculation function in the second embodiment. It should be noted that, because the structural elements with the same reference numerals as those in the first embodiment (FIG. 1) perform the same operation, their detailed description is omitted in the description below.

In the second embodiment, the terminal comprises a receiver 2, a delay profile analysis apparatus 3, and a transmission apparatus 5. The transmission apparatus 5 transmits the pseudo measured ranges $r_{DIFF,M}$ of multiple base stations, obtained from the measurement result of the delay profile, to a base station apparatus 6.

In addition, the calculation apparatus 7 is connected to the base station apparatus 6. The pseudo measured ranges $r_{DIFF,M}$ sent from the transmission apparatus 5 are sent, via the base station apparatus 6, to the calculation apparatus 7, one of center apparatuses. The calculation apparatus 7 is a computer such as a personal computer or a workstation. This computer stores therein a program for executing the calculation method described in FIG. 4 or 5. The calculation apparatus 7 calculates the position of the terminal in accordance with this program.

As described above, the position calculation system in the second embodiment comprises a terminal that comprises a receiver 2 that receives signals from a plurality of antennas located at known and different positions and from a base antenna; a delay profile analysis apparatus 3 that performs delay profile analysis for the signals received by the receiver 2; and a transmission apparatus 5 that transmits delay profile analysis results, produced by the delay profile analysis apparatus 3, to a center apparatus; a base station apparatus 6 that receives the delay profile analysis results from the terminal; and a calculation apparatus 7 (center apparatus) that uses the delay profile analysis results to calculate a position of the terminal. The calculation apparatus 7 comprises pseudo measured range calculation means for calculating, for each of the plurality of antennas, a pseudo measured range $r_{DIFF,M}$ that is a difference between a range from the terminal to each of the plurality of antennas, the range being calculated based on a wireless signal delay time, and a range from the terminal to the base antenna, the range being calculated based on a wireless signal delay time; pseudo range calculation means for calculating, assuming a terminal position and for each of the plurality of antennas, a pseudo range $d_{DIFF,M}$ that is a difference between a range from the assumed terminal position for calculation purposes to each of the plurality of known antennas and a range from the assumed terminal position for calculation purposes to the base antenna; error calculation means for calculating, for each of the plurality of antennas, an error $\Delta m$ that is a difference between the pseudo measured range $r_{DIFF,M}$ calculated by the pseudo measured range calculation means and the pseudo range $d_{DIFF,M}$ calculated by pseudo range calculation means; likelihood calculation means for calculating, assuming that the errors Δm calculated by the error calculation means have a distribution asymmetric for positive and negative values, a likelihood of the assumed terminal position using the distribution and the errors each calculated for each of the plurality of antennas; and terminal position search means for obtaining a point where the likelihood of the assumed terminal position is maximized and for determining an obtained most likely solution as the position of the terminal.

Therefore, the base station apparatus 6 need not send information such as position information to the terminal, preventing information from being leaked from the base station apparatus 6. In addition, calculating the terminal position at the center apparatus eliminates the need for the terminal to perform calculation, thus reducing the power consumption of the terminal. Also, calculating the terminal position at the center apparatus means that a large powerful computer may be used to calculate the position of the terminal more quickly.

Figure 7:
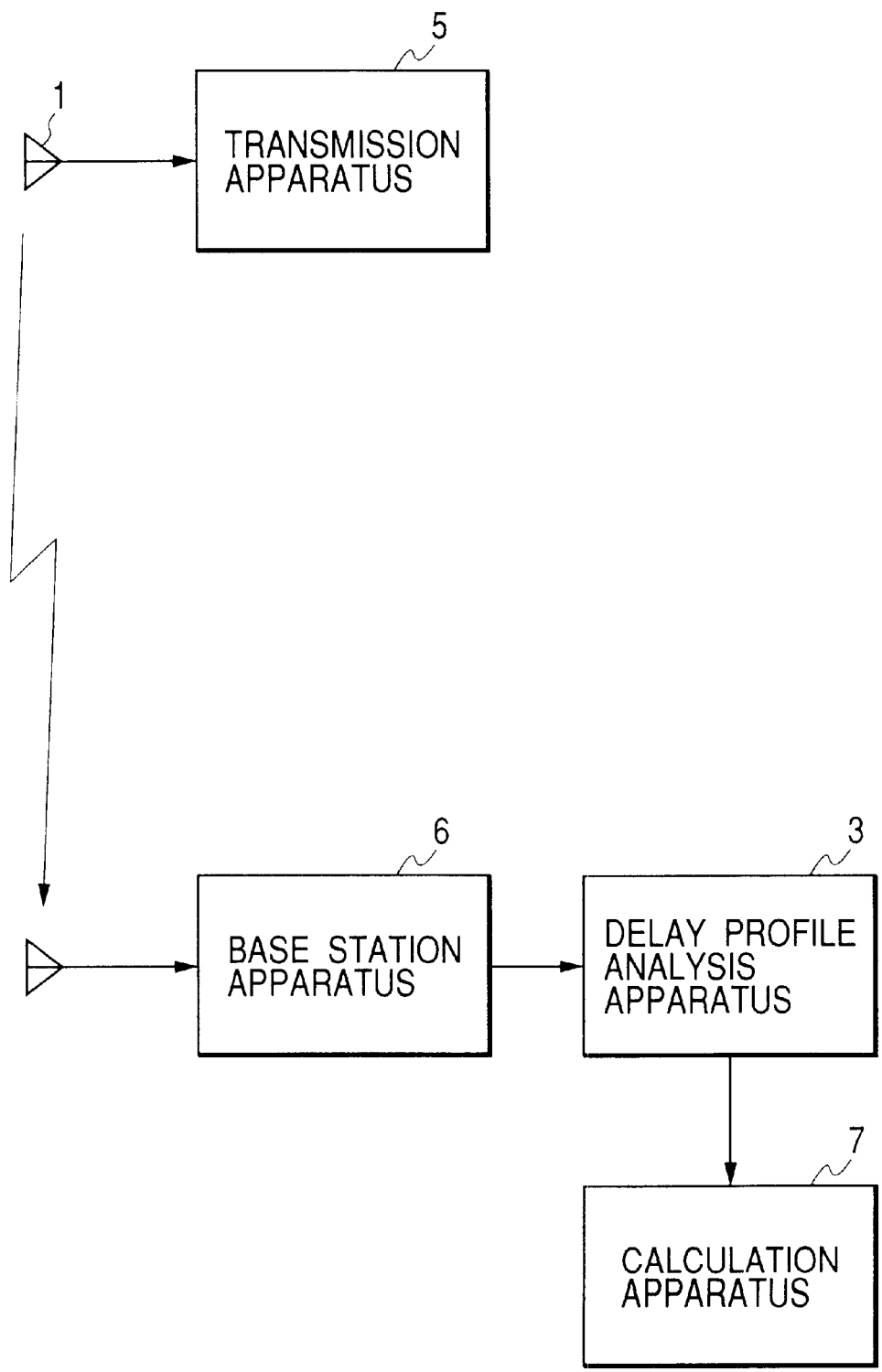
FIG. 7 is a block diagram showing a position detection system in a third embodiment of the present invention.

FIG. 7 is a block diagram showing the general configuration of a position calculation system in a third embodiment of the present invention.

Both in the first and second embodiments, the terminal analyzes the delay profile of the signals sent from the base station apparatus 6 for calculating the position of the terminal. The present invention may be applied also to a case in which the multiple base station apparatuses 6 receive signals sent from the terminal for analysis. It should be noted that, because the structural elements with the same reference numerals as those in the first and second embodiments (FIGS. 1 and 6) perform the same operation, their detailed description is omitted in the description below.

The terminal in the third embodiment comprises a transmission apparatus 5 that transmits a special signal. A base station apparatus 6 receives the signal and sends it to a delay profile analysis apparatus 3 for calculating the pseudo measured range $r_{DIFF,M}$. The obtained pseudo measured range $r_{DIFF,M}$ is sent to a calculation apparatus 7 (center apparatus). The calculation apparatus 7 is a computer such as a personal computer or a workstation. This computer stores therein a program for executing the calculation method described in FIG. 4 or 5. The calculation apparatus 7 calculates the position of the terminal in accordance with this program.

As described above, the position calculation system in the third embodiment comprises a plurality of base station apparatuses 6 (multiple base station apparatuses and reference base station apparatus) that receive signals from a terminal and that are located at known and different positions, a delay profile analysis apparatus 3 that performs delay profile analysis for the signals received by the base station apparatus 6, and a calculation apparatus 7 that uses wireless signal delay times included in delay profile analysis results, produced by the delay profile analysis apparatus 3, to calculate the position of the terminal. The calculation apparatus 7 comprises pseudo measured range calculation means for calculating, for each of the plurality of antennas, a pseudo measured range $r_{DIFF,M}$ that is a difference between a range from the terminal to each of the plurality of wireless apparatuses, the range being calculated based on a wireless signal delay time, and a range from the terminal to the base antenna, the range being calculated based on a wireless signal delay time; pseudo range calculation means for calculating, for each of the plurality of antennas, a pseudo range $d_{DIFF,M}$ that is a difference between a range from an assumed terminal position for calculation purposes to each of the plurality of wireless apparatuses and a range from the assumed terminal position for calculation purposes to the base antenna; error calculation means for calculating, for each of the plurality of antennas, an error Δm that is a difference between the pseudo measured range $r_{DIFF,M}$ calculated by the pseudo measured range calculation means and the pseudo range $d_{DIFF,M}$ calculated by the pseudo range calculation means; likelihood calculation means for calculating, assuming that the errors Δm calculated by the error calculation means have a distribution asymmetric for positive and negative values, a likelihood of the assumed terminal position using the distribution and the errors each calculated for each of the plurality of antennas; and terminal position search means for obtaining a point where the likelihood of the assumed terminal position is maximized and for determining an obtained most likely solution as the position of the terminal. Therefore, the center apparatus can identify the position of the terminal. In addition, because the terminal does not calculation the position, the terminal configuration is simple and, at the same time, the power consumption of the terminal may be reduced.

While the preferred form of the present invention has been described, it is to be understood that the present invention is not limited to the embodiments but that modifications will be apparent to those skilled in the art without departing from the spirit of the present invention.

Further main aspects of the present invention other than those described in the appended claims will be as follows.

(1) a semiconductor device comprising a memory in which a program may be stored and a cpu (central processing unit),
    wherein the memory stores therein a program that causes a computer to execute:
    a first procedure for receiving signals from a plurality of antennas and a base antenna and for calculating, for each of the plurality of antennas, a first range that is a difference between a range from a terminal to each of the plurality of antennas, the range being calculated based on a wireless signal delay time, and a range from the terminal to the base antenna, the range being calculated based on a wireless signal delay time;
    a second procedure for calculating, for each of the plurality of antennas, a second range that is a difference between a range from an assumed terminal position for calculation purposes to each of the plurality of antennas and a range from the assumed terminal position for calculation purposes to the base antenna;
    a third procedure for calculating, for each of the plurality of antennas, an error that is a difference between the first range and the second range;
    a fourth procedure for calculating, assuming that the errors calculated by the error calculation means have a distribution asymmetric for positive and negative values, a likelihood of the terminal position, assumed by the second procedure, using the distribution and the errors each calculated for each of the plurality of antennas; and
    a fifth procedure for repeating the first to fourth procedures to obtain a point where the likelihood is maximized and for determining an obtained most likely solution as the position of the terminal, and wherein the cpu executes the program stored in the memory.

(2) a semiconductor device comprising a memory in which a program may be stored and a cpu,
wherein the memory stores therein a program that causes a computer to execute:
first range calculation means for receiving signals from a plurality of antennas and a base antenna and for calculating, for each of the plurality of antennas, a first range that is a difference between a range from a terminal to each of the plurality of antennas, the range being calculated based on a wireless signal delay time, and a range from the terminal to the base antenna, the range being calculated based on a wireless signal delay time;
second range calculation means for calculating, for each of the plurality of antennas, a second range that is a difference between a range from an assumed terminal position for calculation purposes to each of the plurality of antennas and a range from the assumed terminal position for calculation purposes to the base antenna;
error calculation means for calculating, for each of the plurality of antennas, an error that is a difference between the first range and the second range;
likelihood calculation means for calculating, assuming that the errors calculated by said error calculation means have a distribution asymmetric for positive and negative values, a likelihood of the assumed terminal position using the distribution and the errors each calculated for each of the plurality of antennas; and
terminal position search means for obtaining a point where the likelihood of the assumed terminal position is maximized and for determining an obtained most likely solution as the position of the terminal.

(3) a program that causes a computer to execute a position calculation method wherein a terminal receives signals from a plurality of antennas located at known and different positions and from a base antenna, or the plurality of antennas located at known and different positions and the base antenna receive signals from the terminal, for calculating a position of the terminal using wireless signal delay times,
wherein the program causes a computer to execute:
a first procedure for calculating, for each of the plurality of antennas, a first range that is a difference between a range from the terminal to each of the plurality of antennas, the range being calculated based on a wireless signal delay time, and a range from said terminal to the base antenna, the range being calculated based on a wireless signal delay time;
a second procedure for calculating, for each of the plurality of antennas, a second range that is a difference between a range from an assumed terminal position for calculation purposes to each of the plurality of antennas and a range from the assumed terminal position for calculation purposes to the base antenna;
a third procedure for calculating, for each of the plurality of antennas, an error that is a difference between the first range and the second range;
a fourth procedure for calculating, assuming that the errors calculated by said error calculation means have a distribution asymmetric for positive and negative values, a likelihood of the terminal position, assumed by the second procedure, using the distribution and the errors each calculated for each of the plurality of antennas; and
a fifth procedure for repeating the first to fourth procedures to obtain a point where the likelihood is maximized and for determining an obtained most likely solution as the position of the terminal.

(4) a program that causes a computer to function as a position calculation apparatus that receives signals from a plurality of antennas located at known and different positions and from a base antenna for calculating a position of the terminal using wireless signal delay times,
wherein the program causes a computer to execute:
first range calculation means for calculating, for each of the plurality of antennas, a first range that is a difference between a range from the terminal to each of the plurality of antennas, the range being calculated based on a wireless signal delay time, and a range from the terminal to the base antenna, the range being calculated based on a wireless signal delay time;
second range calculation means for calculating, for each of the plurality of antennas, a second range that is a difference between a range from an assumed terminal position for calculation purposes to each of the plurality of antennas and a range from the assumed terminal position for calculation purposes to the base antenna;
error calculation means for calculating, for each of the plurality of antennas, an error that is a difference between the first range and the second range;
likelihood calculation means for calculating, assuming that the errors calculated by the error calculation means have a distribution asymmetric for positive and negative values, a likelihood of the assumed terminal position using the distribution and the errors each calculated for each of the plurality of antennas; and
terminal position search means for obtaining a point where the likelihood of the assumed terminal position is maximized and for determining an obtained most likely solution as the position of said terminal.

What is claimed is:

1. A position calculation method using signals transmitted between a terminal and a plurality of antennas located at known and different positions, and between the terminal and at least one base antenna for calculating a position of said terminal, said method comprising:
a first procedure for calculating, for each of said plurality of antennas, a first range difference between a first range from said terminal to each of said plurality of antennas and a second range from said terminal to the base antenna, each of said first and second ranges being calculated based on a respective wireless signal delay time;
a second procedure for calculating, for each of said plurality of antennas, a second range difference between a third range from one of a plurality of terminal position candidates to each of said plurality of antennas and a fourth range from the candidate to said base antenna;
a third procedure for calculating, for each of said plurality of antennas, an error that is a difference between the first range difference and the second range difference;

a fourth procedure for calculating based upon the errors calculated for each of said plurality of antennas having an asymmetric distribution for positive and negative values, a likelihood of the candidate using the distribution and the errors; and a fifth procedure for repeating the second to fourth procedures for each of the candidates to obtain a most likely candidate with the maximum likelihood as the position of said terminal.

2. A position calculation method according to claim 1, wherein, in said fourth procedure, the error distribution is a non-negative monotone decreasing function in a range where the errors are positive.

3. A position calculation method according to claim 1, wherein, in said fourth procedure, the error distribution is an exponential function in a range where the errors are positive.

4. A position calculation method according to claim 1, wherein said fourth procedure comprises:

determining a minimum error among the errors;

calculating an error difference between each of the errors and the minimum error; and calculating the likelihood based on an addition result of the error differences.

5. A position calculation method according to claim 4, whereby the likelihood calculating step comprises raising the corrected errors to the n-th power before the addition.

6. A position calculation method according to claim 1, further comprising a procedure for measuring the first range difference a plurality of times, wherein said fourth procedure uses the plural measurements of the first range difference to calculate the likelihood of the candidate.

7. A position calculation method according to claim 6, wherein said fourth procedure places a respective weight on the antennas according to a number of times the first range difference is calculated for said some antennas.

8. A position calculation apparatus comprising a receiver that receives signals from a plurality of antennas located at known and different positions and from a base antenna, a delay profile analysis apparatus that performs delay profile analysis for the signals received by said receiver, and a calculation apparatus that uses wireless signal delay times included in the delay profile analysis produced by said delay profile analysis apparatus, to calculate a position of said position calculation apparatus, wherein said calculation apparatus comprises:

first range difference calculation means for calculating, for each of said plurality of antennas, a first range difference between a first range from said terminal to each of said plurality of antennas and a second range from said terminal to the base antenna, each of said first and second ranges being calculated based on a respective wireless signal delay time;

second range difference calculation means for calculating, for each of said plurality of antennas, a second range difference between a third range from one of a plurality of terminal position candidates to each of said plurality of antennas and a fourth range from the candidate to said base antenna;

error calculation means for calculating, for each of said plurality of antennas, an error that is a difference between the first range difference and the second range difference;

likelihood calculation means for calculating based upon the errors calculated by said error calculation means having an asymmetric distribution for positive and negative values, a likelihood of the candidate using the distribution and the errors; and terminal position search means for obtaining a most likely candidate with the maximum likelihood as the position of said terminal.

9. A position calculation system comprising:

a terminal comprising:

a receiver that receives signals from a plurality of antennas located at known and different positions and from a base antenna;

a delay profile analysis apparatus that performs delay profile analysis for the signals received by said receiver; and transmission apparatus that transmits delay profile analysis results produced by said delay profile analysis apparatus;

a wireless apparatus that receives the delay profile analysis results from said terminal; and a calculation apparatus that uses wireless signal delay times included in the received delay profile analysis results to calculate a position of said terminal, wherein said calculation apparatus comprises:

first range difference calculation means for calculating, for each of said plurality of antennas, a first range difference between a first range from said terminal to each of said plurality of antennas and a second range from said terminal to the base antenna, each of said first and second ranges being calculated based on a respective wireless signal delay time;

second range difference calculation means for calculating, for each of said plurality of antennas, a second range difference between a third range from one of a plurality of terminal position candidates to each of said plurality of antennas and a fourth range from the candidate to said base antenna;

error calculation means for calculating, for each of said plurality of antennas, an error that is a difference between the first range difference and the second range difference;

likelihood calculation means for calculating based upon the errors calculated by said error calculation means having an asymmetric distribution for positive and negative values, a likelihood of the candidate using the distribution and the errors; and terminal position search means for obtaining a most likely candidate with the maximum likelihood as the position of said terminal.

10. A position calculation system comprising a plurality of antennas located at known and different positions and a base antenna that receive signals from a terminal, a delay profile analysis apparatus that performs delay profile analysis for the signals received by the base antenna, and a calculation apparatus that uses wireless signal delay times included in the delay profile analysis produced by said delay profile analysis apparatus, to calculate a position of said terminal, wherein said calculation apparatus comprises:

first range difference calculation means for calculating, for each of said plurality of antennas, a first range difference between a first range from said terminal to each of said plurality of antennas and a second range from said terminal to the base antenna, each of said first and second ranges being calculated based on a respective wireless signal delay time;

second range difference calculation means for calculating, for each of said plurality of antennas, a second range difference between a third range from one of a plurality of terminal position candidates to each of said plurality of antennas and a fourth range from the candidate to said base antenna;

error calculation means for calculating, for each of said plurality of antennas, an error that is a difference between the first range difference and the second range difference;

likelihood calculation means for calculating based upon the errors calculated by said error calculation means having an asymmetric distribution for positive and negative values, a likelihood of the candidate using the distribution and the errors each calculated for each of said plurality of antennas; and terminal position search means for obtaining a most likely candidate with the maximum likelihood as the position of said terminal.

* * * * *